(12) United States Patent
Bhan

(10) Patent No.: US 8,334,905 B2
(45) Date of Patent: Dec. 18, 2012

(54) ZONE, SYSTEM AND FAILURE AWARE SELF ADJUSTING IP SURVEILLANCE CAMERAS

(75) Inventor: Vineet Bhan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 211 days.

(21) Appl. No.: 12/774,567

(22) Filed: May 5, 2010

(65) Prior Publication Data
US 2011/0273567 A1    Nov. 10, 2011

(51) Int. Cl.
*H04N 7/18*    (2006.01)
(52) U.S. Cl. .......................... 348/159; 348/785
(58) Field of Classification Search .................. 348/159, 348/785
See application file for complete search history.

(56) References Cited

U.S. PATENT DOCUMENTS

| | | | |
|---|---|---|---|
| 2004/0239503 A1* | 12/2004 | Rider et al. | 340/572.1 |
| 2005/0086704 A1* | 4/2005 | Rhodes et al. | 725/136 |
| 2006/0022048 A1* | 2/2006 | Johnson | 235/462.1 |
| 2009/0070669 A1* | 3/2009 | Hirota | 715/700 |
| 2009/0262195 A1* | 10/2009 | Yoshida et al. | 348/159 |

* cited by examiner

*Primary Examiner* — Bharat N Barot
*Assistant Examiner* — Marie Georges Henry
(74) *Attorney, Agent, or Firm* — Haynes and Boone, LLP

(57) ABSTRACT

In one embodiment, more than one surveillance cameras cover different viewing zones. The different viewing zones have different priority levels depending upon the importance of what is being covered by the surveillance camera. A controller detects the failure of a surveillance camera and directs a camera covering a lower priority viewing zone to cover the viewing zone of the failed camera. A method for the operation of the surveillance cameras is also provided.

21 Claims, 5 Drawing Sheets

ZONE, SYSTEM AND FAILURE AWARE SELF ADJUSTING IP SURVEILLANCE CAMERAS

TECHNICAL FIELD

The present disclosure relates generally to security systems and in particular to security systems that use surveillance cameras.

BACKGROUND

Surveillance cameras are often used in security systems for both commercial and residential users. Examples of surveillance camera systems may include analog closed-circuit television (CCTV) systems, or analog cameras that send their signal to a video server that digitizes, compresses and distributes the video streams over an Ethernet connection into a computer network. Recently, surveillance camera systems have begun to use digital cameras, including Internet Protocol or IP cameras, that are able to connect directly to a digital computer network. The use of IP cameras may allow homeowners or businesses to view their camera(s) through any internet connection available through a computer of a 3G phone. IP cameras may also be moved anywhere on the IP network allowing for flexibility in the location of the IP cameras. Surveillance cameras may be connected to a network through various means of cabling, such as coaxial, fiber-optic or other types of cabling, or they may be wirelessly connected to a network.

The video signal from the various types of surveillance cameras may be recorded through a variety of means including videotapes such as VHS or through the use of digital video recorder (DVR) technology. Surveillance camera systems may have security personnel that monitor the video signal sent by the cameras on various monitors or televisions; however, many surveillance camera systems are not monitored by personnel, rather their video is only recorded for later viewing if necessary. By not having to pay personnel to continually monitor camera feeds, costs may be reduced, which can be especially important for smaller or less profitable businesses. This cost savings, however, may be offset by reliability issues with unmanned systems. For example, one or more cameras may fail during the surveillance, which may result in one or more zones or areas having no usable recording for subsequent viewing or analysis. One way to overcome this deficiency is to place back-up or redundant cameras in different zones so that if one camera fails, a back-up camera may still be able to record the area, resulting in uninterrupted recorded footage. However, the cost of the system would increase, due in part to having to purchase and install additional cameras.

DESCRIPTION

Overview

In one embodiment, multiple surveillance cameras cover different viewing zones. At least some of the different viewing zones may have different priority levels depending upon the importance of what is being covered by the surveillance camera. A controller detects the failure of a surveillance camera and directs a camera covering a lower priority viewing zone to cover the viewing zone of the failed camera. When the failed camera has been fixed or replaced, the re-directed camera is directed back to its original zone. This may all be accomplished automatically by the system. A system administrator is able to re-prioritize the zones as needed.

As a result, a more important zone is able to be continually monitored and recorded even if the original camera covering the zone fails without incurring costs associated with placing additional cameras in one or more zones.

Description of Example Embodiments

Figure 1:
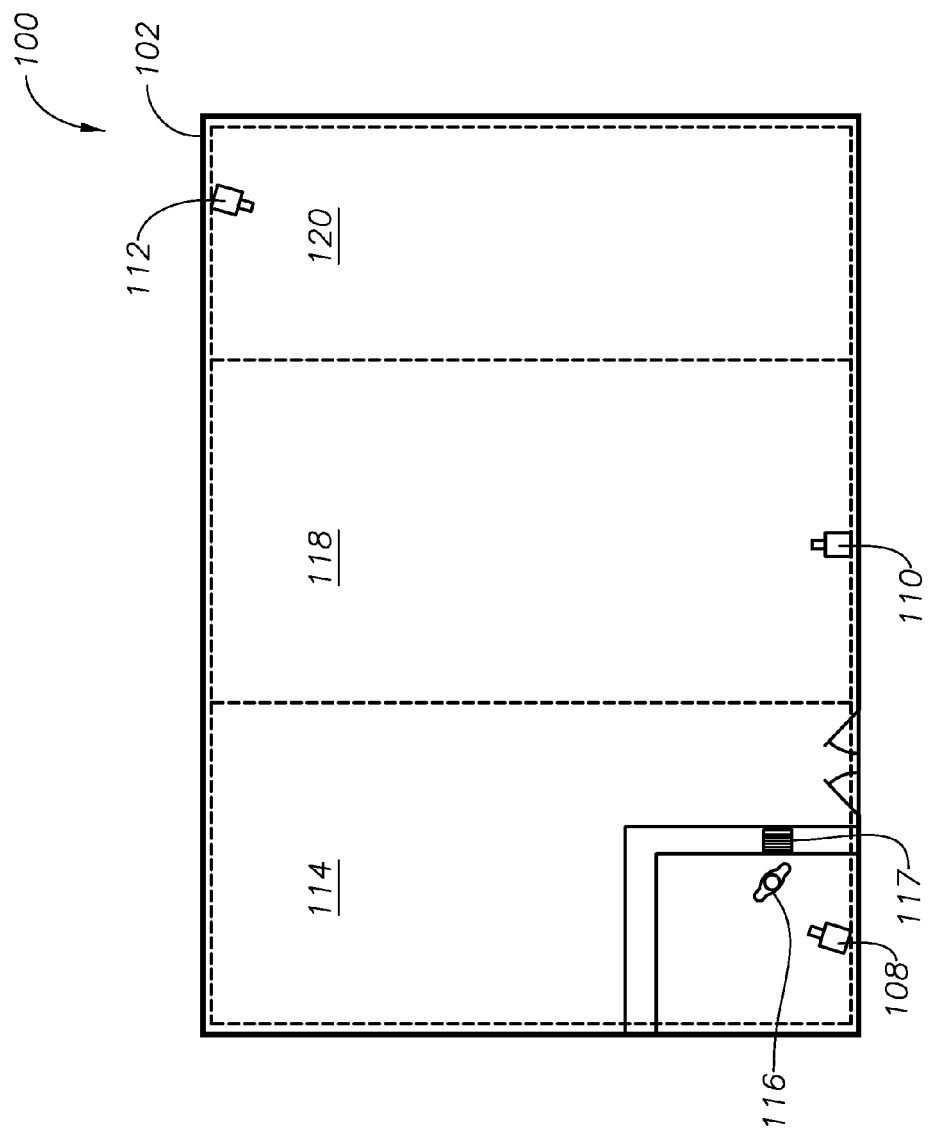
FIG. 1 illustrates an example application of a surveillance camera system.

FIG. 1 is an example of a surveillance camera system 100 for monitoring a commercial retail outlet, such as, for example, a convenience store 102. Surveillance camera system 100 includes security cameras 108, 110 and 112. Security cameras 108, 110 and 112 may be analog or digital cameras and may be digital Internet Protocol (IP) cameras. Security cameras 108, 110 and 112 may be any combination of fixed and/or pan, tilt, zoom (PTZ) cameras. In this example, there are no security personnel monitoring the video signal, and the video signal is merely being recorded. In such a situation, it is common for the surveillance cameras to be of fixed design and to not be PTZ cameras.

Still referring to FIG. 1, in this example, security camera 108 monitors a zone 114, enclosed in the dashed lines to show the field of view of security camera 108, that includes an area where a convenience store clerk 116 checks out customers at a cash register 117. Security camera 110 may monitor zone 118, enclosed in dashed lines, of store 102, such as the liquor area, and security camera 112 may monitor zone 120, enclosed in dashed lines, of store 102, such as food items. Note that field of views are shown in FIG. 1 for ease of illustration and description. Depending on the camera, lens system (e.g., focal view, size of lens, etc.), the number of cameras, placement of the cameras, and the surveillance system, fields of view may expand from the camera, overlap, and/or have zones that are not visible to the cameras (e.g., "blind" zones).

In this example, the three zones of surveillance camera system 100 may have different priorities or level of importance. For example, zone 114 which monitors convenience store clerk 116, may be determined to be a higher priority than either zone 118 or zone 120. Additionally, zone 118 may be determined to be of higher priority than zone 120, but zone 118 is of less priority than zone 114. Note that not all the zones are required to have different priorities. For example, zone 114 may have the highest priority, and zones 118 and 120 may have the same lower priority.

Figure 2:
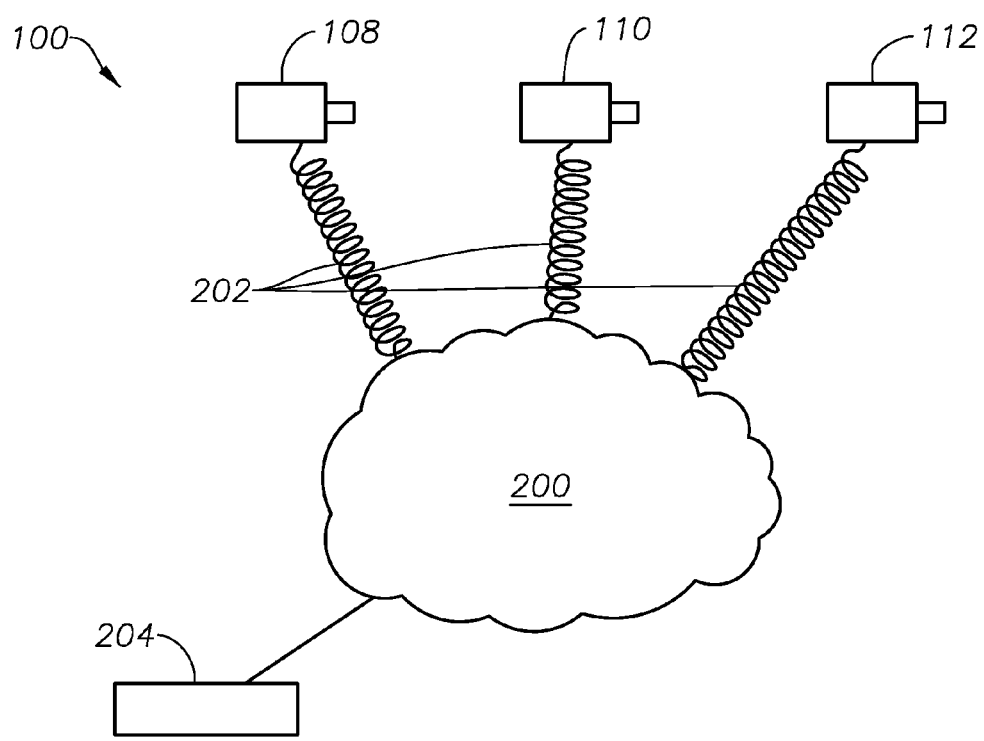
FIG. 2 illustrates an example surveillance camera system.

Referring to FIG. 2, as mentioned above, in this example security cameras 108, 110 and 112 may be IP cameras that communicate with a network 200 through a wireless connection 202. A digital video recorder (DVR) 204 may be connected to network 200 to record the video signals of security cameras 108, 110 and 112. In this example, surveillance camera system 100 is not monitored by security personnel, rather, the video signals of the security cameras are recorded by DVR 204. In an alternative embodiment, security cameras 108, 110, and 112 may be connected through various types of cabling or wired connections. Note that surveillance camera system 100 may be occasionally monitored, such as in checking whether the cameras are placed in a proper position to cover desired areas of the zones.

Figure 3:
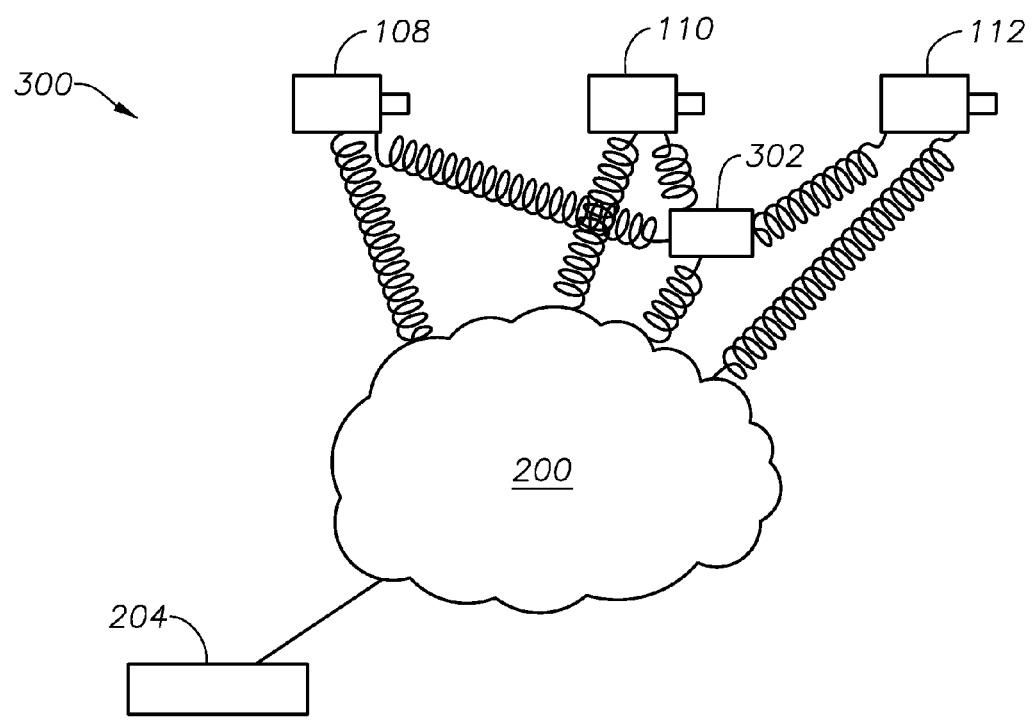
FIG. 3 illustrates an example self adjusting camera system.

Referring to FIG. 3, in this example, a surveillance camera system 300 includes a controller 302 which is connected to security cameras 108, 110 and 112. Controller 302 is programmed with the priority levels of the three zones, zones 114, 118 and 120. Controller 302 has a control logic which will determine whether a camera has become disabled or obscured and then decide whether a lower priority camera should be re-directed to cover the zone of the disabled or obscured camera. The disabled or obscured camera (also referred herein as the "failed" camera) may be a camera that is not able to cover the desired zone or specific areas of the zone, such as a malfunction with the camera, an intentional or unintentional blocking of the camera field of view, or an intentional or unintentional movement of the camera (e.g., the camera now points toward the ceiling).

Controller 302 may be programmed to know the various positions of security cameras 108, 110 and 112. In this example, the cameras covering the lower priority zones may need to have the ability to adjust their viewing position and therefore may need to be PTZ cameras. In an alternative embodiment, controller 302 could be incorporated into a single camera, into each camera, or into the DVR. For example, in the embodiment above, security cameras 108, 110 and 112 are IP cameras that can communicate with each other. Controller 302 could be built into one of the security cameras, or for redundancy and security purposes, controller 302 could be incorporated into one or more of the security cameras. In an embodiment where controller 302 is incorporated into one or more of the security cameras, an algorithm may be provided to select which camera's controller will serve as the master controller. Thus, in this example, the security cameras function to communicate between themselves to select the controller. Functionality may be included to allow for an alternative controller to be selected as the master controller should the previous master controller cease to function. Alternatively, for example in an existing security camera surveillance system that may be using analog cameras, controller 302 could be a stand alone controller that is then connected and configured to communicate with the individual analog cameras.

Figure 4:
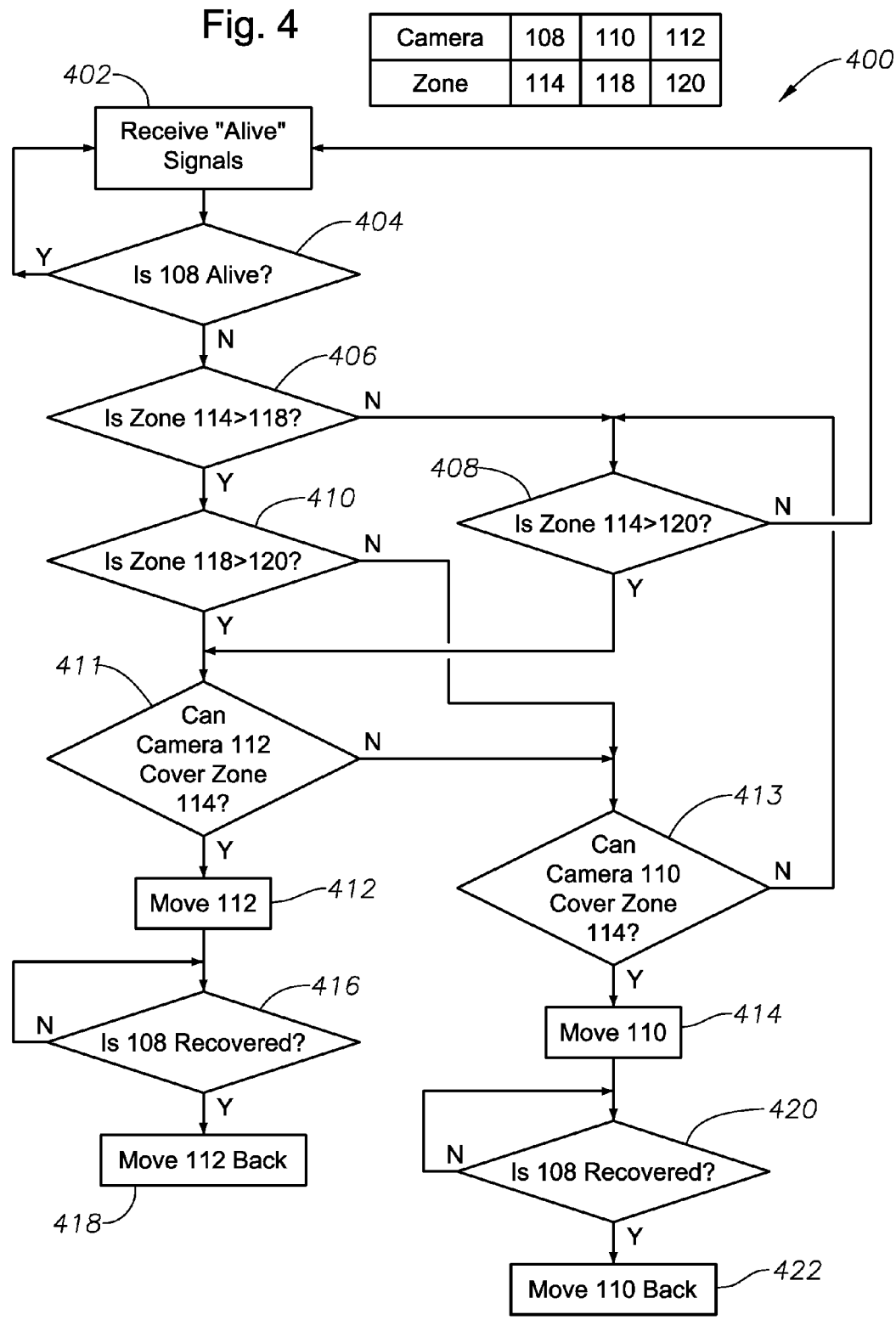
FIG. 4 illustrates an example control logic of a self adjusting camera system.

FIG. 4 is a block diagram of an example of a control logic 400 for controller 302. In step 402, a signal is received from cameras 108, 110 and 112. Alternatively, in step 402, controller 302 could poll each of the cameras to determine the camera's current status. The following logic steps are very similar for cameras 110 and 112, therefore, a detailed explanation will only be provided for camera 108. In step 404, the signal from camera 108 is evaluated to see if camera 108 is functioning properly. This may include comparing the image expected of the camera (e.g., a relatively static image of the cash register portion) with the current image to determine if the current image has changed substantially. For example, the image may change substantially, indicating an improperly functioning camera, if the camera has been moved, the field of vision is blocked, etc. The evaluation may also include checking the quality of the image to see if the image is blurred, darkened, etc. to the point where the image may not be usable, and/or checking if an image even exists such as if the screen is black or no signal is being received from the camera.

In another embodiment, step 404 may include cameras that send status inquiry messages to the other cameras, for example, over an IP network. If the camera is functioning properly, then the camera that receives a status inquiry message would respond with a status message indicating that the responding camera was functioning properly. The camera that sent the status inquiry message may wait for a fixed amount of time after sending the status inquiry message, before they would retry if no response was received after the first status inquiry message and send another status inquiry message to the camera. If after three retries with still no response, then the non-responding camera would be considered malfunctioning and corrective action would be taken as discussed further below. Thus, in this embodiment, step 404 would determine a camera to be malfunctioning based on not receiving a signal from the particular camera.

If, as determined in step 404, camera 108 is functioning properly, then no further evaluation of camera 108 is needed and the controller may evaluate the other cameras. If camera 108 is not functioning properly, such as it has become obscured or disabled, then controller 302 begins a logic process to determine whether a camera covering a lower priority zone should cover the zone that was covered by failed camera 108, and if so, which camera should cover the zone previously covered by camera 108. In step 406, a determination is made whether zone 114 covered by camera 108 is of higher priority than zone 118 covered by camera 110. If the answer in step 406 is no, then in step 408, a determination is made whether zone 114 covered by camera 108 is of higher priority than zone 120 covered by camera 112. If the answer in step 408 is no, then no action is required because camera 108 was covering the lowest priority zone. Thus, zone 114 would remain uncovered until either camera 108 is fixed or replaced or zone 114 is changed to a higher priority than zone 118 and/or zone 120. Note that if a failed camera is detected, the other cameras may be checked in random order, at the same time, or in a predetermined sequence. For example, the camera closest to the failed camera may be checked first.

If step 406 is yes (indicating zone 114 is higher priority than zone 118), then in step 410, a determination is made whether zone 118 covered by camera 110 is of higher priority than zone 120 covered by camera 112. This will allow the camera covering the lowest priority zone to then cover the zone covered by disabled camera 108. If step 410 determines that camera 110 is covering a higher priority zone than camera 112, then, in step 411, the ability of camera 112 to cover zone 114 is checked. This may be because the positioning and/or PTZ movements will not allow camera 112 to view zone 114. If camera 112 can sufficiently cover zone 114, then camera 112 is re-directed in step 412 to cover zone 114 previously covered by the now disabled camera 108. If camera 112 cannot sufficiently cover zone 114, then in step 413 the ability of camera 110 to cover zone 114 is checked. Again, this may be because the positioning and/or PTZ movements will not allow camera 110 to view zone 114.

If camera 110 can sufficiently cover zone 114, then camera 110 is re-directed in step 414 to cover zone 114 previously covered by the now disabled camera 108. In this case, the system has determined that another camera covering a lower priority zone than zone 114, in this example camera 110, can be re-directed, even though camera 110 covers a higher priority zone than zone 120 covered by camera 112. The system can now cover zone 114 (the highest priority) and zone 120 (the lowest priority), which is still preferable to having coverage for only zones 118 and 120 (since camera 112 cannot be re-directed to cover zone 114).

Going back to step 410, if it is determined that camera 112 covering zone 120 is covering a higher priority zone than camera 110 covering zone 118, then in step 413 the ability of camera 110 to cover zone 114 is checked. If camera 110 can sufficiently cover zone 114, then camera 110 is re-directed in step 414 to cover zone 114 previously covered by the now disabled camera 108. If in step 413, camera 110 cannot cover zone 114, then in step 408 it is checked whether zone 114 is of greater priority than zone 120. If in step 413 it is determined that zone 114 is of greater priority than zone 120, then in step 411 a determination is made whether camera 112 can cover zone 114 as described above.

Returning to step 408, if the answer in step 408 is yes, then it is determined that zone 114 covered by camera 108 is of higher priority than zone 120 covered by camera 112. Because it was previously determined in step 406 that camera 108 was covering a lower priority zone than camera 110, it is known, in this example, that camera 112 is the lowest priority and that camera 112 should be re-directed in step 412 to cover zone 114 previously covered by the now disabled camera 108. However, it may be first determined in step 411 whether camera 112 can cover zone 114, and thus control logic 400 proceeds to step 411.

Returning to step 412, camera 112 was redirected to cover zone 114 previously covered by the now disabled camera 108. In step 416, a determination is made whether camera 108 has recovered, for example, if a signal is received that camera 108 has recovered, been repaired or replaced, if so, then camera 112 is redirected back to cover its original configuration in step 418. Likewise, after step 414 in step 420, if a signal is received that camera 108 has recovered, been repaired or replaced, as determined in step 420, then camera 110 is redirected back to cover its original configuration in step 422.

The above example is merely for illustrative purposes and other embodiments may employ different or alternative methods of determining which camera to select to replace a higher priority camera that has failed.

Figure 5:
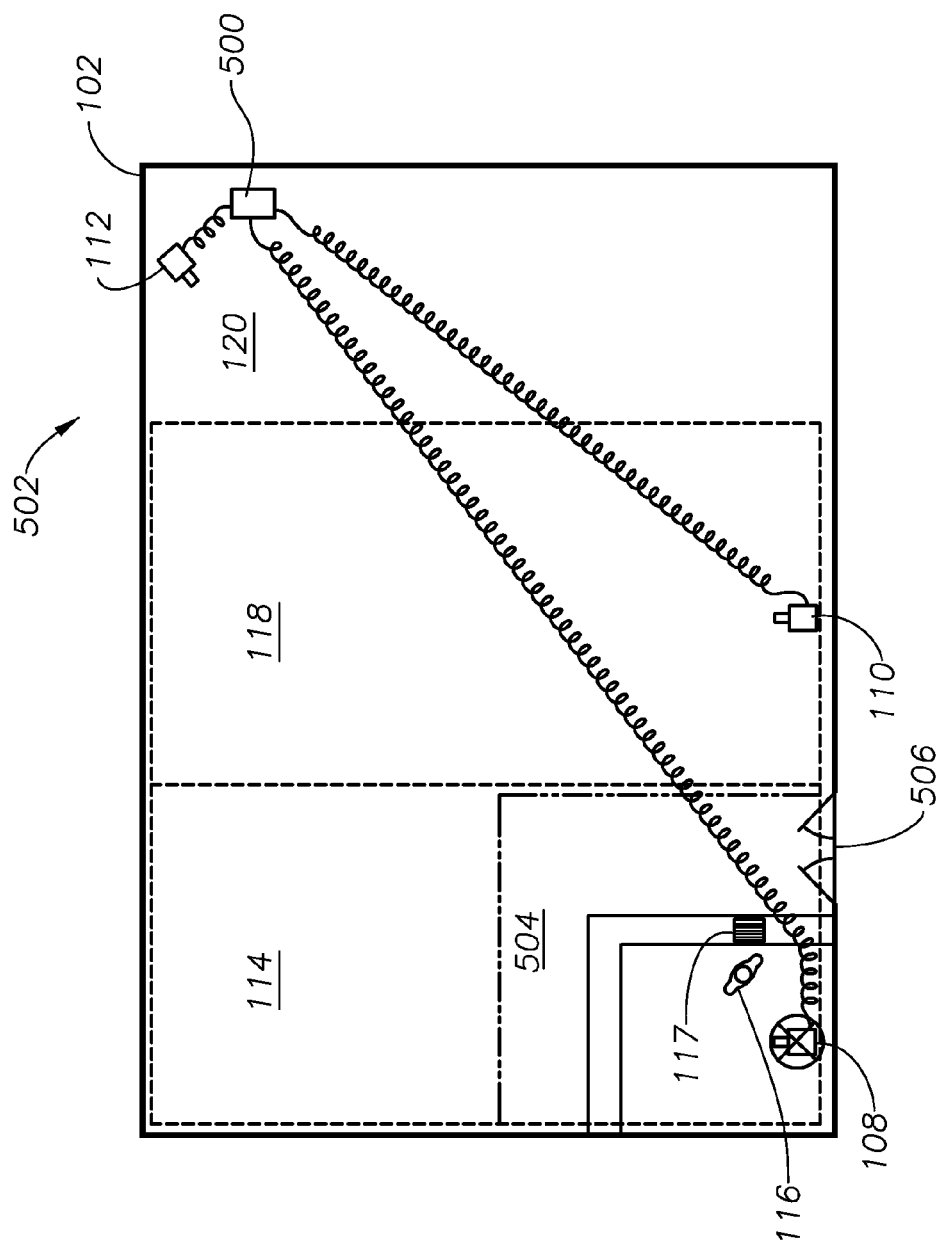
FIG. 5 illustrates an example application of a self adjusting camera system.

Referring now to FIG. 5, in this example, using the camera and zone arrangement previously discussed for FIG. 1, a controller 500 has been added to a surveillance system 502. In this example, zone 114, which was covered by camera 108 which in this example has now failed, was the highest priority zone, followed in priority by zone 118, covered by camera 110 and then the lowest priority zone 120, covered by camera 112. Using the logic process described above and after determining that camera 112 has the ability to cover zone 114, controller 500 may keep camera 110 covering the medium priority zone 118 and re-direct camera 120, previously covering the lowest priority zone 120, to now cover zone 114. The high priority zone 114 is now covered by surveillance camera 112, the medium priority zone 118 continues to be covered by camera 110, and the lowest priority zone 120 is without coverage.

Note that the repositioning and determination whether a camera can cover a different zone described above may not require an entire zone be covered with the repositioning. Due to limitations with cameras and/or systems, a camera in a lower priority zone may not be able to entirely cover a higher priority zone. In that situation, the camera may still need to be repositioned if it can cover an important part of the higher priority zone. For example, in FIG. 5, camera 112 may not be able to cover zone 114 in it entirety, but may be positioned such that it can cover a zone 504, which is a portion of zone 114. Zone 504 may include store clerk 116, cash register 117, and a door 506.

Therefore, it should be understood that embodiments of the invention can be practiced with modification and alteration within the spirit and scope of the appended claims. The description is not intended to be exhaustive or to limit the invention to the precise form disclosed. For example, the above description focused on commercial retail outlets, such as a convenience store. However, any location where unmanned surveillance with multiple zones and cameras may be suitable. Examples include financial institutions, where areas that have cash or exchange cash may have higher priority for surveillance, residences, where rooms containing valuables or having children present may have higher priority for surveillance, technology companies, where rooms or areas containing confidential or valuable data/information/documents may have a higher priority, manufacturing centers, where areas employing confidential processes may have a higher priority, and distribution centers, where areas where merchandise is accessible may have a higher priority.

Furthermore, embodiments of the invention can be combined with video motion detection, as is known to one of ordinary skill in the art, to only record video based on detected motion. This is a feature that would reduce the amount of the recorded video. Alternatively, or in addition to, embodiments of the invention could be combined with video content analysis or similar video analytics, as is known to one of ordinary skill in the art, to count the number of people that enter a space or to identify certain behavior such as, for example, suspicious behavior such as reaching over the cash register or walking behind a store clerk's counter. Embodiments of the invention could also be modified to send an alert, for example, an email alert, if one of the surveillance cameras fails or becomes obscured, or upon the identification of suspicious behavior.

What is claimed is:

1. An apparatus comprising:
   surveillance cameras covering different viewing zones, wherein at least one of the different viewing zones has a different priority level than another one of the different viewing zones and wherein at least one surveillance camera is positioned to cover one viewing zone with a priority level and at least another one of surveillance cameras is positioned to cover another viewing zone of a different priority level; and
   a controller, wherein the controller detects a failure of one of the surveillance cameras and 1) directs another one of the surveillance cameras covering a lower priority viewing zone to cover the viewing zone of the failed camera or 2) leaves the viewing zone of the failed camera unchanged if there are no viewing zones having a priority level lower than the viewing zone of the failed camera.

2. The apparatus of claim 1, wherein the controller directs a camera covering a lowest priority viewing zone to cover the viewing zone of the failed camera.

3. The apparatus of claim 1, wherein the controller returns the cameras to their original viewing zones when the failed camera is returned to a functioning state.

4. The apparatus of claim 1, wherein the controller determines whether the another one of the surveillance cameras can cover the viewing zone of the failed camera.

5. The apparatus of claim 1, wherein the controller compares a current image of a camera with an expected image of the camera to detect a failure.

6. The apparatus of claim 1, wherein the controller checks a quality of a camera's image to determine if the image is obscured to where the image is not viewable.

7. The apparatus of claim 1, wherein the controller monitors a signal being received from one of the cameras to detect a failure.

8. The apparatus of claim 1, wherein the controller sends a status inquiry message to the cameras to detect a failure.

9. The apparatus of claim 1, wherein the surveillance cameras comprise wireless IP cameras.

10. The apparatus of claim 1, wherein the controller counts the people that enter a viewing zone.

11. The apparatus of claim 1, wherein the controller sends an alert based on automatic detection of certain behavior in a viewing zone.

12. A method comprising:
operating surveillance cameras that cover different viewing zones, wherein at least one of the different viewing zones has a different priority level than another one of the different viewing zones and wherein at least one surveillance camera is positioned to cover one viewing zone with a priority level and at least another one of surveillance cameras is positioned to cover another viewing zone of a different priority level;
determining whether a surveillance camera has failed;
determining whether any surviving surveillance cameras cover a zone of lesser priority than the zone of the failed surveillance camera; and
directing a surviving surveillance camera that covers a zone of lesser priority than the zone of the failed surveillance camera to cover the zone of the failed surveillance camera or leaving the viewing zone of the failed camera unchanged if there are no viewing zones having a priority level lower than the viewing zone of the failed camera.

13. The method of claim 12, further comprising:
determining which surviving camera covers a zone of lowest priority and is still able to cover the viewing zone of the failed camera; and
directing that surviving camera to cover the zone of the failed surveillance camera.

14. The method of claim 12, further comprising returning the cameras to their original viewing zones when the failed camera is returned to a functioning state.

15. The method of claim 12, wherein determining whether a surveillance camera has failed comprises comparing a current image of a camera with an expected image of the camera.

16. The method of claim 12, wherein determining whether a surveillance camera has failed comprises checking a quality of the camera's image to determine if the image is obscured to where the image is not viewable.

17. The method of claim 12, wherein determining whether a surveillance camera has failed comprises monitoring a signal being received from one of the cameras.

18. The method of claim 12, wherein determining whether a surveillance camera has failed comprises sending a status inquiry message to one of the cameras.

19. The method of claim 12, further comprising automatically counting the people that enter a viewing zone.

20. The method of claim 12, further comprising sending an alert based on automatic detection of certain behavior in a viewing zone.

21. An apparatus comprising:
surveillance cameras covering different viewing zones, wherein at least one of the different viewing zones has a different priority level than another one of the different viewing zones and wherein at least one surveillance camera is positioned to cover one viewing zone with a priority level and at least another one of surveillance cameras is positioned to cover another viewing zone of a different priority level; and
means for detecting the failure of a surveillance camera and 1) directing a camera covering a lower priority viewing zone to cover the viewing zone of the failed camera or 2) leaving the viewing zone of the failed camera unchanged if there are no viewing zones having a priority level lower than the viewing zone of the failed camera.

* * * * *